(12) United States Patent  (10) Patent No.: US 7,414,688 B2
Kim  (45) Date of Patent: Aug. 19, 2008

(54) IN-PLANE SWITCHING LCD PANEL

(75) Inventor: Jong-Sung Kim, Koyang-shi (KR)

(73) Assignee: LG Display Co., Ltd., Seoul (KR)

( * ) Notice: Subject to any disclaimer, the term of this patent is extended or adjusted under 35 U.S.C. 154(b) by 1109 days.

(21) Appl. No.: 09/771,591

(22) Filed: Jan. 30, 2001

(65) Prior Publication Data

US 2003/0179333 A1  Sep. 25, 2003

(30) Foreign Application Priority Data

Jan. 31, 2000  (KR) ................................ 2000-4748

(51) Int. Cl.
*G02F 1/1343* (2006.01)
(52) U.S. Cl. .................................................... 349/141
(58) Field of Classification Search ................. 349/141, 349/143, 106
See application file for complete search history.

(56) References Cited

U.S. PATENT DOCUMENTS 5,598,285 A * 1/1997 Kondo et al. .................. 349/39
5,745,207 A * 4/1998 Asada et al. ................. 349/141
6,075,582 A * 6/2000 Onnagawa et al. .......... 349/145
6,538,713 B1 * 3/2003 Yanagawa et al. ........... 349/146
6,630,977 B1 * 10/2003 Yamazaki et al. ........... 349/141
6,671,019 B1 * 12/2003 Petschek et al. ............. 349/129
6,741,310 B1 * 5/2004 Nakanishi et al. ........... 349/141
6,795,150 B2 * 9/2004 Yanagawa et al. ........... 349/141

FOREIGN PATENT DOCUMENTS

JP  11-223830  8/1999

OTHER PUBLICATIONS

Communication from Korean Patent Office dated Nov. 24, 2005.

* cited by examiner

*Primary Examiner*—James A Dudek
(74) *Attorney, Agent, or Firm*—McKenna Long & Aldridge LLP

(57) ABSTRACT

An IPS-LC panel includes first and second substrates, and a liquid crystal interposed therebetween. The first substrate includes common and pixel electrodes that are spaced apart from each other. Each of the common and pixel electrodes includes a zigzag pattern having a plurality of indentations and protrusions. The zigzag pattern increases an electric field level applied between the common and pixel electrodes.

32 Claims, 7 Drawing Sheets

IN-PLANE SWITCHING LCD PANEL

This application claims the benefit of Korean Patent Application No. 2000-4748, filed on Jan. 31, 2000, which is hereby incorporated by reference as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

Recently, light and thin liquid crystal display (LCD) devices with low power consumption are used in office automation equipment, video devices, and the like. Such LCDs typically uses an optical anisotropy and spontaneous polarization of a liquid crystal (LC). The LC has thin and long LC molecules, which causes an orientational alignment of the LC molecules. Therefore, alignment direction of the LC molecules is controlled by applying an electric field to the LC molecules. When the alignment direction of the LC molecules are properly adjusted, the LC is aligned and light is refracted along the alignment direction of the LC molecules to display image data. Of particular interest is an active matrix (AM) LCD, in which a plurality of thin film transistors and pixel electrodes are arranged in the shape of an array matrix, because of its high resolution and superiority in displaying moving pictures. Driving methods for such LCDs typically include a twisted nematic (TN) mode and a super twisted nematic (STN) mode.

FIG. 1 is a cross-sectional view illustrating a conventional LC panel in a typical LCD device. As shown in FIG. 1, the LC panel has lower and upper substrates 1a and 1b with a liquid crystal layer ("LC") interposed between the lower and upper substrates 1a and 1b. The lower substrate 1a has a thin film transistor ("TFT") as a switching element for changing orientation of the LC molecules. The TFT includes a pixel electrode 15 to apply a voltage to the LC layer according to signals from the TFT. The upper substrate 1b has a color filter 25 for implementing colors. There is a common electrode 14 on the color filter 25. The common electrode 14 serves as an electrode for applying a voltage to the LC layer. The pixel electrode 15 is arranged over a pixel portion "P", i.e., a display area. Further, to prevent leakage of the liquid crystal injected into the space between the two substrates 1a and 1b, the two substrates 1a and 1b are sealed by a sealant 6.

As described above, because the pixel and common electrodes 15 and 14 of the conventional LC panel are positioned on the lower and upper substrates 1a and 1b, respectively, the electric field induced therebetween is perpendicular to the lower and upper substrates 1a and 1b. The above-mentioned LC panel has high transmittance and aperture ratio. In addition, since the common electrode on the upper substrate serves as a ground, static electricity is prevented from destroying the LC panel.

Although TN-LCDs and STN-LCDs having the same structure as shown in FIG. 1 have been put to practical use, they have a drawback in that they have a very narrow viewing angle. In order to solve the problem of narrow viewing angle, IPS-LCD devices have been proposed. IPS-LCD devices typically include a lower substrate where a pixel electrode and a common electrode are disposed, an upper substrate having no electrode, and a liquid crystal interposed between the upper and lower substrates. The IPS-LCD device has advantages in contrast ratio, gray inversion, and color shift that are related to the viewing angle.

A detailed explanation about operation modes of a typical IPS-LC panel will be provided referring to FIGS. 2 to 6.

As shown in FIG. 2, lower and upper substrates 1a and 1b are spaced apart from each other, and a liquid crystal is interposed therebetween. The lower and upper substrates are called array and color filter substrates, respectively. Pixel and common electrodes 15 and 14 are disposed on the lower substrate 1a. The pixel and common electrodes 15 and 14 are parallel with and spaced apart from each other. A color filter 25 is disposed on a surface of the upper substrate 1b and opposes the lower substrate 1a. The pixel and common electrodes 15 and 14 apply an electric field "E" to the liquid crystal. The liquid crystal has a negative dielectric anisotropy, and thus it is aligned parallel with the electric field "E".

FIGS. 3 to 6 conceptually illustrate operation modes of a conventional IPS-LCD device. When there is no electric field between the pixel and the common electrodes 15 and 14, the long axes of the liquid crystal molecules maintain an angle from a line perpendicular to the parallel pixel and common electrodes 15 and 14. Herein, the angle is 45 degrees, for example.

On the contrary, when there is an electric field between the pixel and common electrodes 15 and 14, there is an in-plane electric field "E" parallel to the surface of the lower substrate 1a between the pixel and common electrodes 15 and 14. The in-plane electric field "E" is parallel to the surface of the lower substrate 1a because the pixel and common electrodes are formed on the lower substrate 1a. Accordingly, the liquid crystal molecules are twisted so as to align the long axes thereof with the direction of the electric field, thereby the liquid crystal molecules are aligned such that the long axes thereof are parallel with the line perpendicular to the pixel and common electrodes 15 and 14.

By the above-mentioned operation modes and with additional parts such as polarizers and alignment layers, the IPS-LCD device displays images. The IPS-LCD device has wide viewing angle and low color dispersion. Specifically, the viewing angle of the IPS-LCD device is about 70 degrees in direction of up, down, right, and left. In addition, the fabricating processes of this IPS-LCD device are simpler than other various LCD devices. However, because the pixel and common electrodes are disposed on the same plane of the lower substrate, the transmittance and aperture ratio are low.

For the sake of discussing the above-mentioned problem of the IPS-LCD device in detail, with reference to FIGS. 7A and 7B, the basic structure of the IPS-LCD device will be described in detail.

FIG. 7A is a plan view illustrating in detail the structure of one pixel region in the IPS-LCD device, specifically, a unit pixel region 10. In addition, a cross-sectional view taken along a line "B-B" in FIG. 7A is illustrated in FIG. 7B.

On the surface of the transparent substrate 1A adjacent to the liquid crystal layer, a scan signal line 2 made of, for example, aluminum (Al) is formed extending along the x-direction, as shown in FIG. 7A. In addition, a reference signal line 4, also known as a common line, is formed extending along the x-direction, close to the scan signal line 2 on the +y-direction side thereof. The reference signal line 4 is also made of, for example, Al. A region surrounded by the scan signal line 2, the reference signal line 4, and the video signal lines 3 constitutes a pixel region 10, as previously described.

In addition, the pixel region 10 includes a reference electrode 14 formed by the reference signal line 4, and another reference electrode 14 formed adjacent to the scan signal line 2. The pair of horizontally extending reference electrodes 14 are positioned adjacent to one of a pair of video signal lines 3 (on the right side of the figure), and are electrically connected to each other through a conductive layer 14A, which is formed simultaneously with the reference electrodes 14.

In the structure described above, the reference electrodes 14 form a pair extending in the direction parallel to the scan signal line 2. Stated another way, the reference electrodes form a strip extending in a direction perpendicular to the video signal lines 3, later described.

A first insulating film 11 (see FIG. 7B) made of, for example, silicon nitride is formed on the surface of the lower substrate 1A on which the scan signal lines 2 are formed, overlying the scan signal line 2, the reference signal lines 4, and the reference electrodes 14. The first insulating film 11 functions as (i) an inter-layer insulating film for insulating the scan signal line 2 and the reference signal line 4 from the video signal lines 3, (ii) as a gate-insulating layer for a region in which a thin film transistor (TFT) is formed, and (iii) as a dielectric film for a region in which a capacitor Cstg is formed. The TFT includes a drain electrode 3A and a source electrode 15A. A semiconductor layer 12 for the TFT is formed near a cross point of the gate and data lines 2 and 3. A first polarization layer 18 is formed on the other surface of the lower substrate 1A.

On the first insulating film 11, a display electrode 15 is formed parallel with the reference electrode 14. One end portion of the display electrode 15 is electrically connected with the conductive layer 14A, and the other end portion thereof is electrically connected with the source electrode 15A. Still on the first insulating film 11, a first planar film 16 is formed to cover the display electrode 15. A first alignment film 17 is formed on the first planar film 16.

FIG. 7B illustrates a cross-sectional view of the upper substrate 1B on which a black matrix 300 is formed. A color filter 25 is formed to close an opening in the black matrix 300. Then, a second planar film 27 is formed to cover the color filter 25 and the black matrix 300. A second alignment layer 28 is formed on the surface of the second planar film 27 facing the liquid crystal layer.

The color filter 25 is formed to define three sub-pixel regions adjacent to and extending along the video signal line 3 and to position a red (R) filter, a green (G) filter, and a blue (B) filter, for example, from the top of the three sub-pixel regions. The three sub-pixel regions constitute one pixel region for color display.

A second polarization layer 29 is also arranged on the surface of the upper substrate 1B that is opposite to the surface of the upper substrate 1B adjacent to the liquid crystal layer, on which various films are formed as described above.

It will be understood that in FIG. 7B, a voltage applied between the reference electrodes 14 and the display electrode 15 causes an electric field E to be generated in the liquid crystal layer LC in parallel with the respective surfaces of the lower and upper substrates 1A, 1B. This is why the illustrated structure is referred to as the in plane switching, as mentioned above.

To improve the aperture ratio, the distance between the reference and display electrodes 14 and 15 should be enlarged. In that case, a driving voltage to induce the electric field between the reference and display electrodes 14 and 15 must be increased to maintain a normal display. Further, since the low aperture ratio results in a low brightness quality of the liquid crystal display device, the incident light from the backlight device must be brighter to compensate, which increases power consumption of the liquid crystal display device.

Since the pixel and common electrodes 15 and 14 are formed on the same substrate, the aperture ratio is reduced. That is to say, the opaque pixel and common electrodes prevent incident light produced by a backlight (not shown) from passing through pixel areas covered by the pixel and common electrodes. If distances between the common and pixel electrodes are enlarged to improve the aperture ratios, much stronger driving voltage must be generated between the electrodes to compensate for the loss of the electric fields due to the greater distance therebetween. In addition, the intensity of the backlight must be increased to compensate for the loss of the backlight due to the decrease in the aperture ratios. Therefore, power consumption will be increased.

Now, the above-mentioned aperture problem of the conventional IPS-LCD device will be explained in detail with reference to FIG. 7C. FIG. 7C is an enlarged (and rotated) plan view of a portion "A" of FIG. 7A.

As shown in FIG. 7C, if a distance "L" between the common and pixel electrodes 14 and 15 is increased, the aperture ratio problem can be solved. However, in that case, a threshold voltage to drive the liquid crystal should be higher. That is to say, the threshold voltage "$V_{th}$" is proportional to "L/d", where "d" is the width of the pixel electrode 15 ($V_{th} \propto L/d$). If the distance "L" is increased, the electric field applied between the pixel and common electrodes becomes weaker. Therefore, the voltage difference to generate the electric field must be increased to maintain normal operation of the IPS-LCD device. However, because the driving circuits that provide the voltage difference to the electrodes have limited capability to further increase the voltage difference, the distance "L" cannot be increased enough to solve the aperture ratio problem.

In short, when the distance L between the common and pixel electrodes 14 and 15 is increased, the aperture ratio is improved to achieve a higher luminance. However, the increase in the distance L causes a loss of the electric field between the common and pixel electrodes. To compensate for the loss of the electric field, the voltage difference between the common and pixel electrodes should become higher. However, the exterior driving circuits cannot provide enough voltage difference to compensate for the loss of the electric field.

SUMMARY OF THE INVENTION

Accordingly, the present invention is directed to an IPS-LCD device that substantially obviates one or more of the problems due to limitations and disadvantages of the related art.

An object of the present invention is to provide an IPS-LCD device having a high aperture ratio and a low operating voltage.

In order to achieve the above object, the first preferred embodiment of the present invention provides a liquid crystal display device, which includes a substrate; a thin film transistor on the substrate; a pixel electrode on the substrate, the pixel electrode including a zigzag pattern having a plurality of protrusions and indentations; and a common electrode on the substrate, the common electrode having the same shape as the pixel electrode.

At least one of the pixel and common electrodes includes a material selected from a group consisting of chromium (Cr), aluminum (Al), aluminum alloy (Al alloy), molybdenum (Mo), tantalum (Ta), tungsten (W), antimony (Sb), an alloy thereof, indium zinc oxide (IZO), and indium tin oxide (ITO).

The protrusion and indentation have a rectangular shape.

The device further includes an alignment layer on the pixel and common electrodes. The alignment layer is selected from a group consisting of polyamic acid and polyimide.

In another aspect, the present invention provides a liquid crystal display device, which includes a first substrate including a switching device; a second substrate including a color filter; a liquid crystal layer between the first and second substrates; and first and second electrodes on the first substrate, each of the first and second electrodes having a zigzag pattern having plurality of protrusions and indentations.

The second electrode has the same shape as the first electrode.

At least one of the first and second electrodes includes a material selected from a group consisting of chromium (Cr), aluminum (Al), aluminum alloy (Al alloy), molybdenum (Mo), tantalum (Ta), tungsten (W), antimony (Sb), an alloy thereof, indium zinc oxide (IZO), and indium tin oxide (ITO).

The device further includes a first alignment layer on the first substrate. The first alignment layer is selected from a group consisting of polyamic acid and polyimide.

The device further includes a second alignment layer on the second substrate. The second alignment layer is selected from a group consisting of polyamic acid and polyimide.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 8:
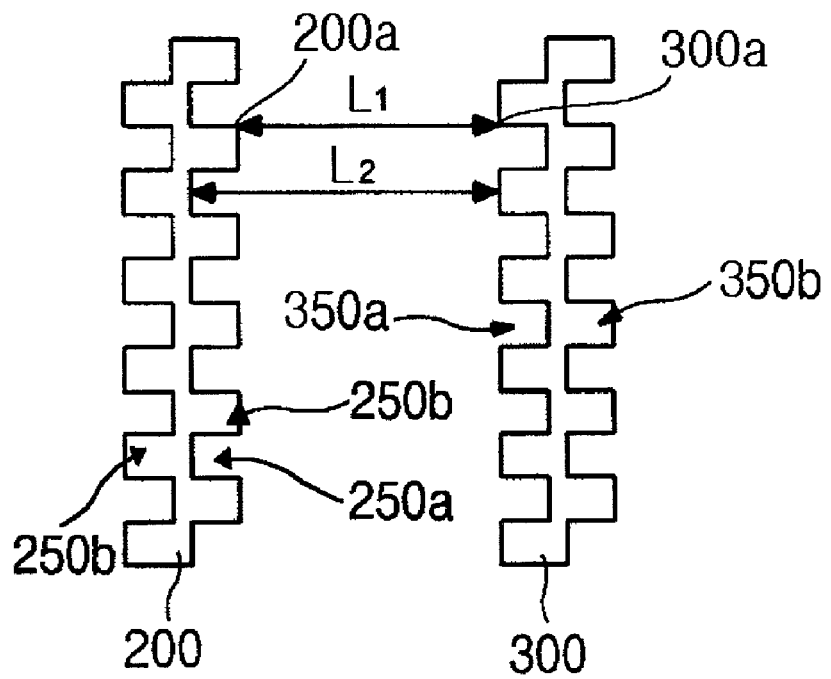
FIG. 8 is an enlarged plan view of a couple of common and pixel electrodes according to a preferred embodiment of the present invention.

FIG. 8 is a partially enlarged plan view of an array substrate of an IPS-LCD device according to the preferred embodiment of the present invention.

As shown, on a pixel region, a common electrode 200 and a pixel electrode 300 are formed substantially parallel with each other. Each of the common and pixel electrodes 200 and 300 has a plurality of inwardly extending indentations 250a, 350a and outwardly extending protrusions 250b, 350b. The indentations and protrusions 250a, 250b, 350a and 350b are alternately formed in each electrode such that each electrode has an alternating or zigzag pattern. Because the common electrode 200 has the same alternating or zigzag pattern as the pixel electrode 300, each protrusion 250b of the common electrode 200 opposes a corresponding indentation 350a of the pixel electrode, and vice versa. Each of the indentations 250a, 350a, and protrusions 250b, 350b have a substantially rectangular shape.

Figure 1:
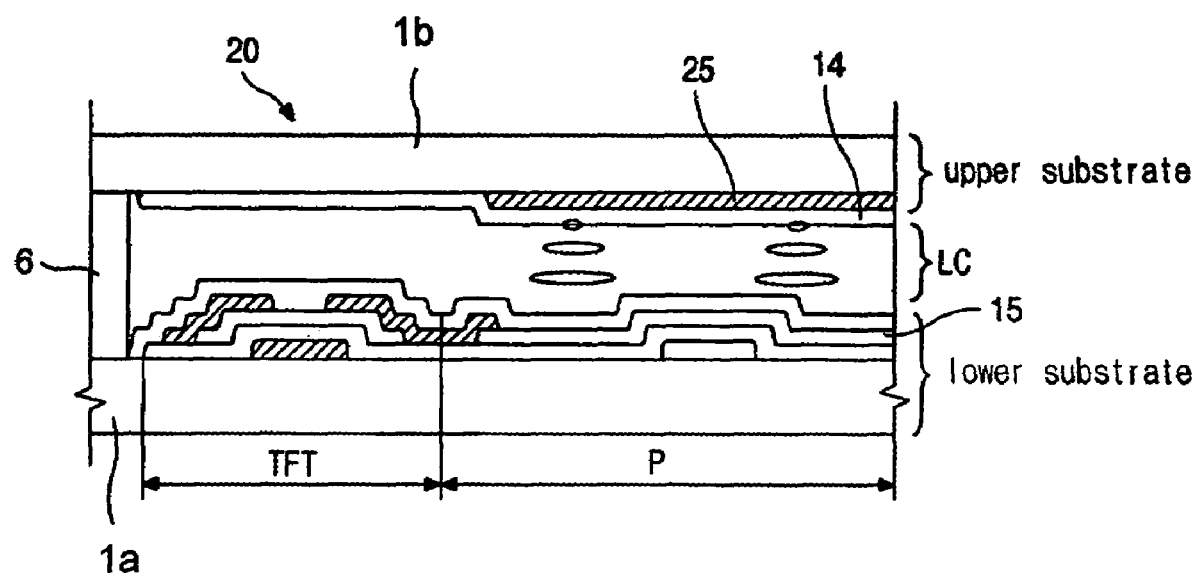
FIG. 1 is a cross-sectional view illustrating a liquid crystal display device according to the related art.
Figure 1:
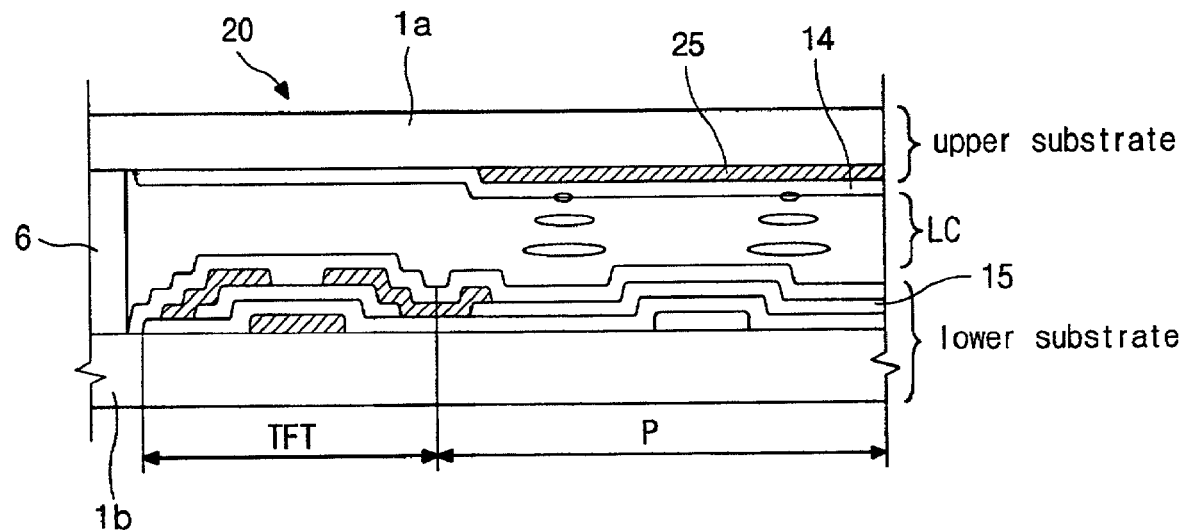
Figure 2:
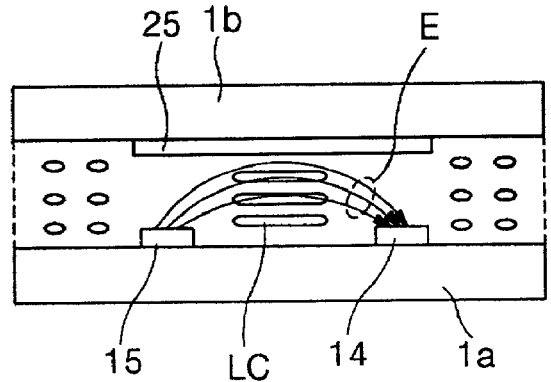
FIGS. 2 to 6 are perspective views illustrating operation modes of the conventional IPS-LCD device.
Figure 3:
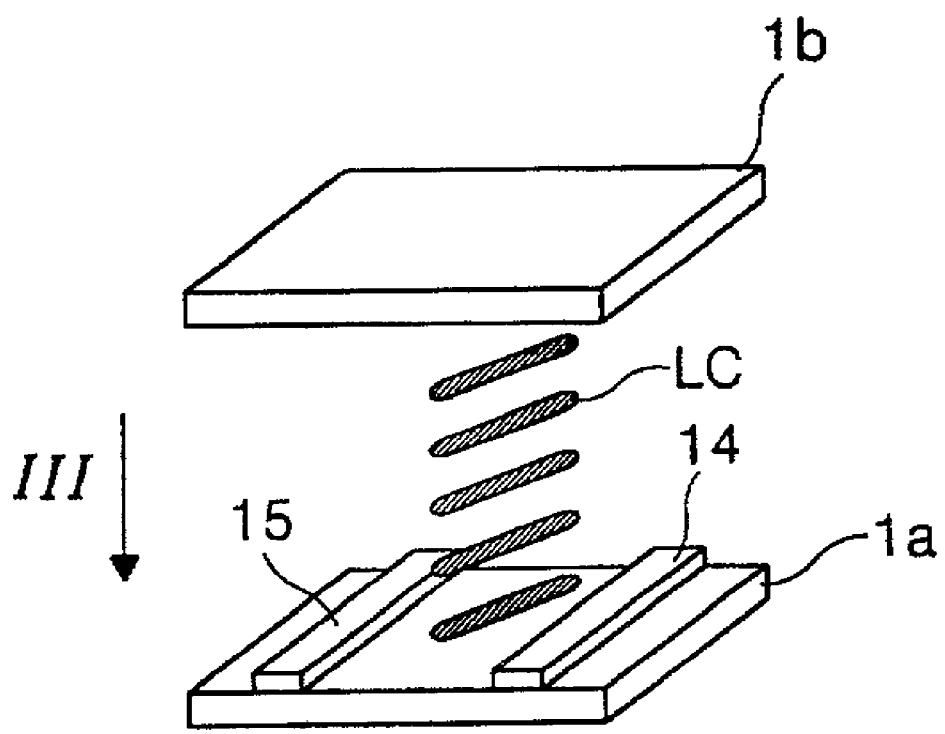
Figure 4:
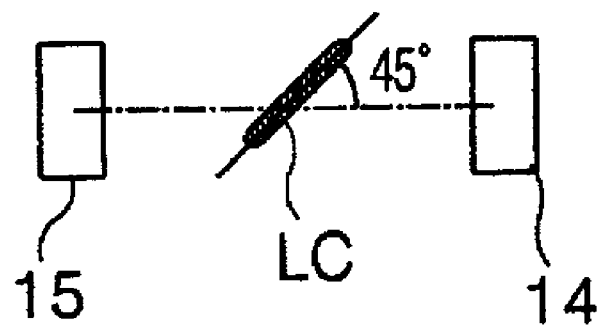
Figure 5:
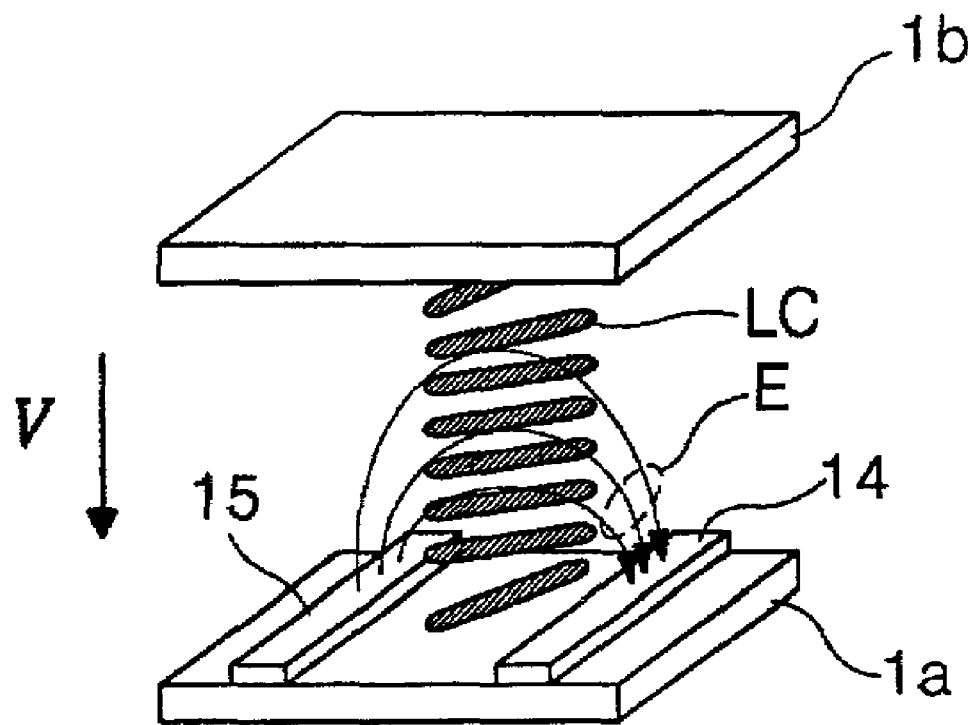
Figure 6:
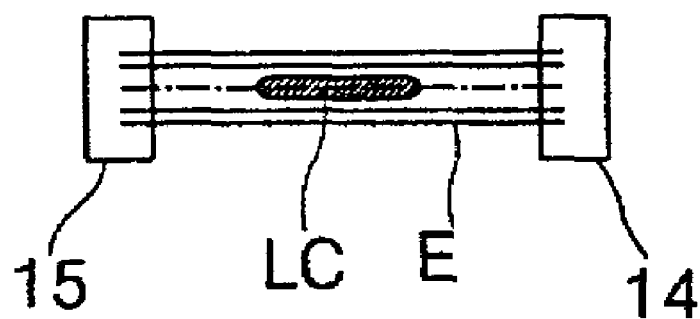
Figure 7A:
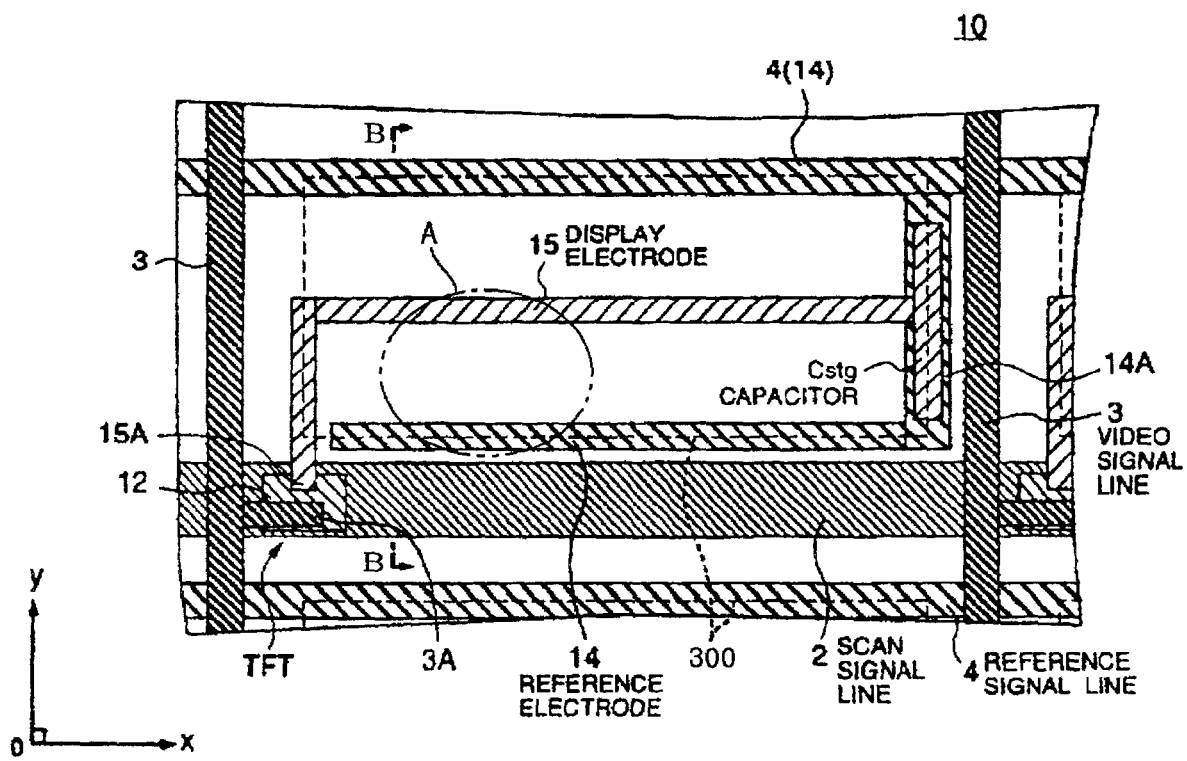
FIG. 7A is a plan view illustrating an array substrate of the conventional IPS-LCD device.
Figure 7B:
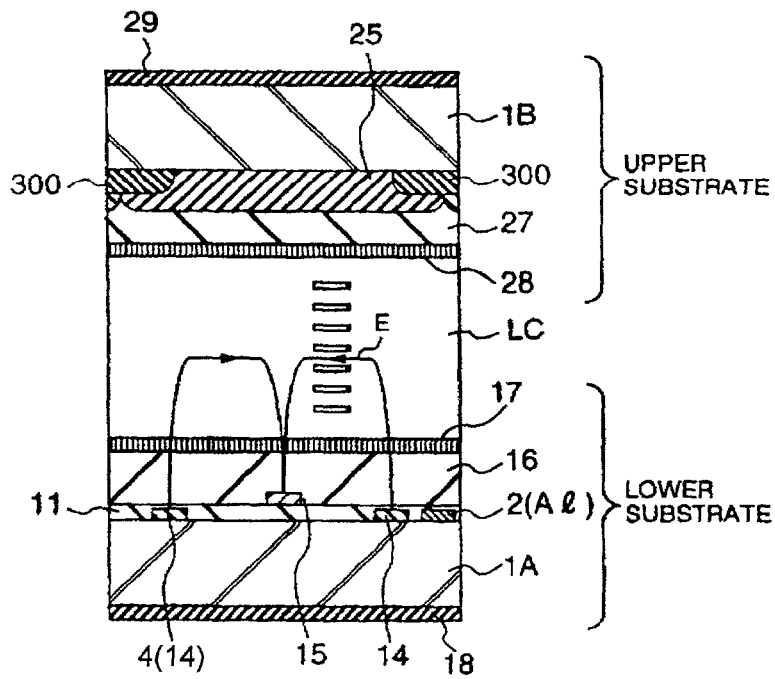
FIG. 7B is a cross-sectional view taken along a line "B-B" in FIG. 7A.
Figure 7C:
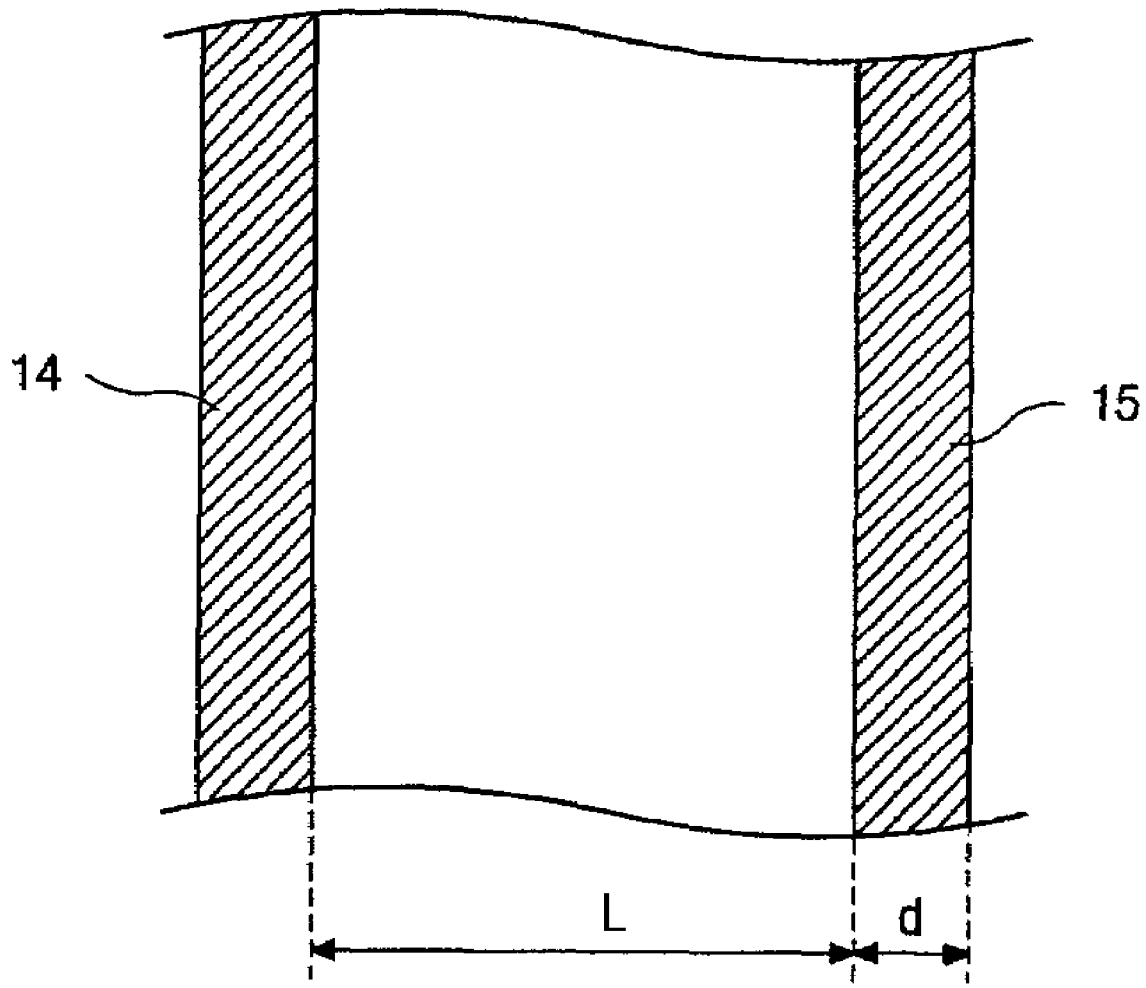
FIG. 7C is an enlarged plan view of a portion "A" of FIG. 7A.

A first distance L1 denotes a distance between opposing innerfacing (i.e., toward the center line of the pixel region) edges of the inward projecting protrusions 250b, 350b of the common electrode 200 and pixel electrode 300, while a second distance L2 denotes a distance between an innerfacing edge of the inner indentation 250a of the common electrode 200 and an innerfacing edge of the inward projecting protrusion 350b of pixel electrode 300 and vice versa, as shown in FIG. 8. Therefore, the first distance L1 is smaller than the second distance L2, which preferably has the same value as a distance "L" measured between conventional common and pixel electrodes shown in FIG. 7C. That is to say, each outermost apex 200a of the common electrode 200 and each corresponding outermost apex 300a of the pixel electrode 300 has the first distance L1 therebetween, and the first distance L1 is smaller than the distance L between the conventional pixel electrode and common electrode.

With a voltage difference generated between the common and pixel electrodes 200 and 300, a stronger electric field is achieved because of the smaller distance L1 between the apexes 200a and 300a. Therefore, in comparison with the conventional pixel and common electrodes of FIG. 7C, though a smaller voltage difference is applied between the common and pixel electrodes 200 and 300, at least the same electric field level is induced therebetween. Namely, low power consumption is achieved by the preferred embodiment.

A threshold voltage to operate the IPS-LCD device is proportional to the distance between the common and pixel electrodes. Namely, as the distance between the common and pixel electrodes increase, the threshold voltage to operate a liquid crystal should increase. In other words, with a large distance between the common and pixel electrodes, a high aperture ratio is achieved for an improved luminance of the IPS-LCD device. However, to compensate for an electric field loss due to the enlarged distance between the common and pixel electrodes, a higher voltage difference should be generated between the common and pixel electrodes. Therefore, a higher threshold voltage is needed. If the distance between the common and pixel electrodes is decreased to decrease the threshold voltage, the aperture ratio rapidly decreases and a sufficient luminance greater than 200 candelas per square meter (200 nit) cannot be achieved.

Recently, users need a large scale and a high resolution (for example, an UXGA) for an LCD device, increasingly. With the larger scale and higher resolution, a pixel region of the LCD device becomes much smaller and thus it is difficult to achieve a sufficient aperture ratio. A wide viewing angle is the most important quality factor for the large-scaled LCD device, and the IPS-LCD device is preferred for the wide viewing angle. However, the IPS-LCD device has a disadvantage in providing the high resolution due to its configuration of the common and pixel electrodes.

To achieve both of the wide viewing angle and high resolution, the preferred embodiment of the present invention provides the alternating or zigzag pattern for the common electrode 200 and the pixel electrode 300 of the IPS-LCD device. Because of the alternating or zigzag-patterned common and pixel electrodes, a sufficient distance for good aperture ratio is achieved between the common and pixel electrodes without loss of the electric field therebetween, or without increasing the operation voltage.

The common electrode 200 and the pixel electrode 300 are preferably selected from a group consisting of chromium (Cr), aluminum (Al), aluminum alloy (Al alloy), molybdenum (Mo), tantalum (Ta), tungsten (W), antimony (Sb), an alloy thereof, indium tin oxide (ITO), and indium zinc oxide (IZO).

An alignment layer (reference 17 of FIG. 7B) is formed over the common electrode 200 and pixel electrode 300 to face a liquid crystal layer (not shown). The alignment layer is selected from a group consisting of polyamic acid and polyimide.

Figure 9:
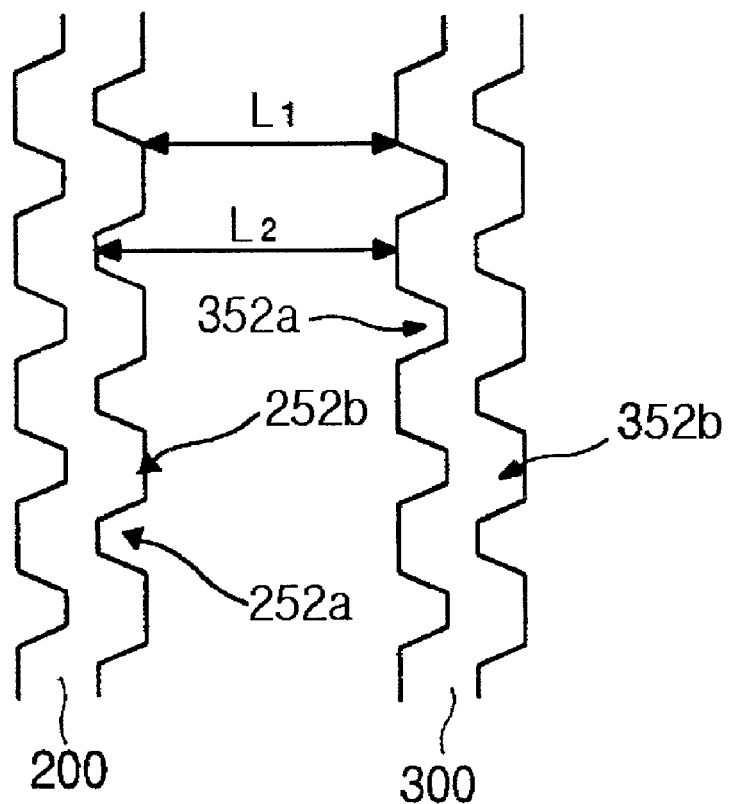
FIG. 9 is an enlarged plan view of a modification of the common and pixel electrodes according to the preferred embodiment of the present invention.

FIG. 9 illustrates a modification of the preferred embodiment shown in FIG. 8. As shown in FIG. 9, each of the common and pixel electrodes 200 and 300 includes a plurality of substantially trapezoidal indentations 252*a*, 352*a*, and substantially trapezoidal protrusions 252*b*, 352*b*. While the present examples include substantially rectangular and substantially trapezoidal protrusions and indentations, the protrusions and indentations have no limit in their shapes. For example, each of them may have a substantially triangular shape.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a substrate;
a thin film transistor on the substrate;
a pixel electrode on the substrate, the pixel electrode having a first plurality of protrusions and a first plurality of indentations, wherein each of the first plurality of protrusions includes a first flat zone and first edges at opposite sides of the first flat zone; and
a common electrode on the substrate, the common electrode having a second plurality of protrusions and a second plurality of indentations, wherein each of the second plurality of protrusions includes a second flat zone and second edges at opposite sides of the second flat zone, wherein a horizontal distance is substantially perpendicular to the length of the pixel electrode and wherein a first horizontal distance between each of the first edges and each of the second edges is less than a second horizontal distance between each of the second plurality of indentations and each of the first plurality of protrusions.

2. The device of claim 1, wherein at least one of the pixel and common electrodes includes a material selected from a group consisting of chromium (Cr), aluminum (Al), aluminum alloy (Al alloy), molybdenum (Mo), tantalum (Ta), tungsten (W), antimony (Sb), an alloy thereof, indium zinc oxide (IZO), and indium tin oxide (ITO).

3. The device of claim 1, wherein the first and second plurality of protrusion have a substantially rectangular shape.

4. The device of claim 1, further comprising an alignment layer on the pixel and common electrodes.

5. The device of claim 4, wherein the alignment layer is selected from a group consisting of polyamic acid and polyimide.

6. A liquid crystal display device comprising:
a first substrate including a switching device;
a second substrate including a color filter;
a liquid crystal layer between the first and second substrates; and
first and second electrodes on the first substrate, wherein the first electrode has a first plurality of protrusions and a first plurality of indentations, wherein each of the first plurality of protrusions includes a first flat zone and first edges at opposite sides of the first flat zone, wherein each of a second plurality of protrusions includes a second flat zone and second edges at opposite sides of the second flat zone, and wherein a horizontal distance is substantially perpendicular to the length of the first electrode and wherein a first horizontal distance between each of the first edges and each of the second edges is less than a second horizontal distance between each of the second plurality of indentations and each of the first plurality of protrusions.

7. The device of claim 6, wherein the second electrode has substantially the same shape as the first electrode.

8. The device of claim 6, wherein at least one of the first and second electrodes includes a material selected from a group consisting of chromium (Cr), aluminum (Al), aluminum alloy (Al alloy), molybdenum (Mo), tantalum (Ta), tungsten (W), antimony (Sb), an alloy thereof, indium zinc oxide (IZO), and indium tin oxide (ITO).

9. The device of claim 6, further comprising a first alignment layer on the first substrate.

10. The device of claim 9, wherein the first alignment layer is selected from a group consisting of polyamic acid and polyimide.

11. The device of claim 6, further comprising a second alignment layer on the second substrate.

12. The device of claim 11, where in the second alignment layer is selected from a group consisting of polyamic acid and polyimide.

13. A liquid crystal display device comprising:
a substrate;
a thin film transistor on the substrate;
a first electrode on the substrate, the first electrode alternating a first plurality of indentations and a first plurality of protrusions, wherein each of the first plurality of protrusions includes a first flat zone and first edges at opposite sides of the first flat zone; and
a second electrode on the substrate, spaced apart from the first electrode and alternating a second plurality of indentations and a second plurality of protrusions, wherein each of the second plurality of protrusions includes a second flat zone and second edges at opposite sides of the second flat zone, wherein a horizontal distance is substantially perpendicular to the length of the first electrode, wherein a horizontal distance between each of the first edges and each of the second edges is less than a horizontal distance between each of the second plurality of indentations and each of the first plurality of protrusions, and wherein a side portion between each of the first edge and a bottom of each of the first plurality of indentations is inclined.

14. The liquid crystal display device of claim 13, wherein the first electrode and the second electrode have substantially the same shape.

15. A liquid crystal display device comprising:
a first substrate including a switching device;
a second substrate including a color filter;
a liquid crystal layer between the first and second substrates; and
first and second electrodes on the first substrate, wherein the first electrode alternates a first plurality of indentations with a first plurality of protrusions, wherein each of the first plurality of protrusions includes a first flat zone and first edges at opposite sides of the first flat zone, wherein a second electrode alternates a second plurality of indentations with a second plurality of protrusions, wherein each of the second plurality of protrusions includes a second flat zone and second edges at opposite sides of the second flat zone, wherein a horizontal distance is substantially perpendicular to the length of the first electrode, wherein the first and second plurality of protrusions and indentations include first and second inner indentations and protrusions, respectively, such that the first inner indentations and protrusions are opposite to a side of the second electrodes having the second inner indentations and protrusions such that a horizontal distance between each of the first edges and each of the second edges is less than a horizontal distance between each of the second plurality of indentations and each of the first plurality of protrusions, and wherein a side portion between each of the first edge and a bottom of each of the first plurality of indentations is perpendicular to the first electrode.

16. The liquid crystal display device of claim 15, wherein the first and second electrodes form a zigzag pattern, respectively.

17. The device of claim 15, wherein the second electrode has substantially the same shape as the first electrode.

18. The device of claim 15, wherein at least one of the first and second electrodes includes a material selected from a group consisting of chromium (Cr), aluminum (Al), aluminum alloy (Al alloy), molybdenum (Mo), tantalum (Ta), tungsten (W), antimony (Sb), an alloy thereof, indium zinc oxide (IZO), and indium tin oxide (ITO).

19. The device of claim 15, further comprising a first alignment layer on the first substrate.

20. The device of claim 19, wherein the first alignment layer is selected from a group consisting of polyamic acid and polyimide.

21. The device of claim 15, further comprising a second alignment layer on the second substrate.

22. The device of claim 21, wherein the second alignment layer is selected from a group consisting of polyamic acid and polyimide.

23. The device of claim 13, wherein at least one of the first and second electrodes includes a material selected from a group consisting of chromium (Cr), aluminum (Al), aluminum alloy (Al alloy), molybdenum (Mo), tantalum (Ta), tungsten (W), antimony (Sb), an alloy thereof, indium zinc oxide (IZO), and indium tin oxide (ITO).

24. The device of claim 13, wherein the protrusion and indentations have a substantially rectangular shape.

25. The device of claim 13, further comprising an alignment layer on the first and second electrodes.

26. The device of claim 25, wherein the alignment layer is selected from a group consisting of polyamic acid and polyimide.

27. The device of claim 1, wherein the first and second plurality of protrusions have a substantially trapezoidal shape.

28. The device of claim 6, where the first and second plurality of protrusions have a substantially trapezoidal shape.

29. The device of claim 13, wherein the first and second plurality of protrusions have a substantially trapezoidal shape.

30. The device of claim 15, wherein the first and second protrusions have a substantially trapezoidal shape.

31. The device of claim 13, wherein the first and second plurality of protrusions have a substantially rectangular shape.

32. The device of claim 15, wherein the first and second plurality of protrusions have a substantially rectangular shape.

* * * * *